United States Patent
Grivas

[15] 3,706,758
[45] Dec. 19, 1972

[54] 2-(1-ADAMANTANYL)-1,2-BENZISOTHIAZOLIN-3-ONE
[72] Inventor: John C. Grivas, South Holland, Ill.
[73] Assignee: The Sherwin-Williams Company, Cleveland, Ohio
[22] Filed: June 18, 1971
[21] Appl. No.: 154,678

[52] U.S. Cl..................................260/304, 424/270
[51] Int. Cl. ...............................................C07d 91/10
[58] Field of Search.......................................260/304

[56] References Cited

UNITED STATES PATENTS 3,661,974   5/1972   Grivas...................................260/304

*Primary Examiner*—Alex Mazel
*Assistant Examiner*—R. J. Gallagher
*Attorney*—Richard G. Smith et al.

[57] ABSTRACT

A novel compound, 2-(1-adamantanyl)-1,2-benzisothiazolin-3-one, is found to be useful as a microbiocide.

1 Claim, No Drawings

2-(1-ADAMANTANYL)-1,2-BENZISOTHIAZOLIN-3-ONE

This invention relates to a N-substituted 1,2-benzisothiazolin-3-one having the structural formula:

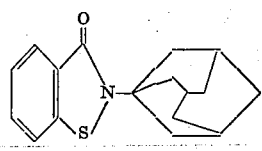

The compound may be made by several processes. For instance, the synthesis may use as starting materials, dithiodibenzoyl chloride, chlorine and 1-adamantanamine (amantadine; 1-aminotricyclo-[3.3.1.1$^{3,7}$]decane), according to the following reactions:

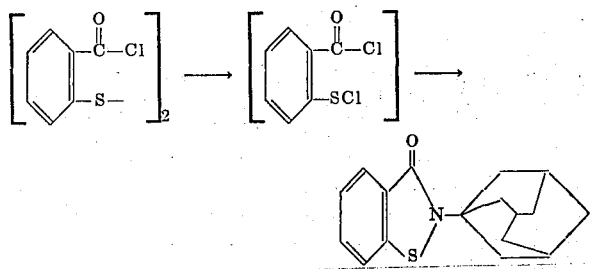

The product has been found to be an active microbicide, especially against fungi. The adamantanamine derivatives are of interest as experimental antiviral compounds.

Synthesis — To a stirred suspension of 69 parts by weight of dithiodibenzoyl chloride in 800 parts of carbon tetrachloride is added a stoichiometric excess of dry chlorine, keeping the temperature below 20° C. The chlorine in added until practically all solid goes into solution. Stirring is continued for an additional 15 minutes while maintaining the temperature at 25°–30° C. Excess chlorine is stripped from the mixture by vacuum, and the solution is filtered. This reaction solution is added incrementally to a stirred solution of 59 parts by weight of 1-adamantanamine in 490 parts of pyridine. Exothermic heat is removed by cooling to keep the reaction batch below 30° C. during the entire period of addition. Stirring is continued for 15 minutes after the addition, and the temperature is raised to 75°–80° C. for another 15 minutes. The mixture is poured into about 3,250 parts of diluted hydrochloric acid solution (about 10% HCl). After separation of the mixture into two liquid phases, the aqueous layer is washed twice with 48 parts of carbon tetrachloride. The combined carbon tetrachloride phase is dried over anhydrous calcium chloride and evaporated to dryness, yielding 105 parts by weight of 2-(1-adamantanyl)-1,2-benzisothiazolin-3-one. The melting point of the product is 177°–179° C. Infrared and nuclear magnetic resonance studies confirmed the structure.

An analytical sample was prepared by recrystallization of the compound (1 part) from hexane (10 parts) to obtain a pure white crystalline compound, melting at 180°–181° C.

ELEMENTAL ANALYSIS

Calculated for $C_{17}H_{19}NOS$: C, 71.54; H, 6.71; N, 4.91; S, 11.23.

Found: C, 71.43; H, 6.64; N, 5.00; S, 11.18.

The purity was found to be 99 percent by thin layer chromotography.

Microbiocidal Tests — Fungicidal activity has been found for two test organisms, *Pullularia pullulans* and *Penicillium oxalicum*. The test procedure used was a serial dilution series to determine the minimum inhibitory concentration (MIC) to stop growth of the test organism in an organic nutrient.

The test procedure for MIC used as the nutrient a sterile Sabouraud Liquid Medium. The adamantanyl benzisothiazolinone was dissolved in a solvent, made to volume with the nutrient medium by standard serial dilution technique, and the sample was incubated at 25° C. for 7 days. The MIC for the Pullularia species was 0.25 percent and for the Penicillium species was 0.125 percent. The compound may be used for controlling various micro-organisms by applying biocidally effective amount of the adamantanyl benzisothiazolinone to the locus of the micro-organism. The compound may be incorporated in an inert carrier for application in controlling growth of the organism.

While the invention has been described by specific examples, there is no intent to limit the inventive concept except as set forth in the following claim.

I claim:

1. 2-(1-Adamantanyl)-1,2-Benzisothiazolin-3-one.

* * * * *